(12) United States Patent
Hata et al.

(10) Patent No.: US 10,976,487 B2
(45) Date of Patent: Apr. 13, 2021

(54) MANUFACTURING DEVICE AND MANUFACTURING METHOD OF OPTICAL FIBER GRATING

(71) Applicant: Fujikura Ltd., Tokyo (JP)

(72) Inventors: Keiichiro Hata, Sakura (JP); Kenichi Ohmori, Sakura (JP)

(73) Assignee: FUJIKURA LTD., Tokyo (JP)

( * ) Notice: Subject to any disclaimer, the term of this patent is extended or adjusted under 35 U.S.C. 154(b) by 325 days.

(21) Appl. No.: 16/078,211

(22) PCT Filed: Dec. 15, 2016

(86) PCT No.: PCT/JP2016/087447
§ 371 (c)(1),
(2) Date: Aug. 21, 2018

(87) PCT Pub. No.: WO2017/163505
PCT Pub. Date: Sep. 28, 2017

(65) Prior Publication Data
US 2019/0047239 A1 Feb. 14, 2019

(30) Foreign Application Priority Data
Mar. 25, 2016 (JP) .............................. JP2016-062322

(51) Int. Cl.
*G02B 6/02* (2006.01)
*G02B 6/34* (2006.01)

(52) U.S. Cl.
CPC ........... *G02B 6/02123* (2013.01); *G02B 6/02* (2013.01); *G02B 6/02138* (2013.01);
(Continued)

(58) Field of Classification Search
None
See application file for complete search history.

(56) References Cited

U.S. PATENT DOCUMENTS 5,837,169 A 11/1998 Rourke
6,284,437 B1 9/2001 Kashyap
(Continued)

FOREIGN PATENT DOCUMENTS

CN 1232547 A 10/1999
CN 1415080 A 4/2003
(Continued)

OTHER PUBLICATIONS

Asseh A et al: "A writing technique for long fiber Bragg gratings with complex reflectivity profiles", Journal of Lightwave Technology, IEEE, USA, vol. 15, No. 8, Aug. 1, 1997, pp. 1419-1423. (5 pages).

(Continued)

*Primary Examiner* — Michelle R Connelly
(74) *Attorney, Agent, or Firm* — Westerman, Hattori, Daniels & Adrian, LLP (57) ABSTRACT

A manufacturing device of an optical fiber grating to write a grating in a core of an optical fiber by irradiating the optical fiber with laser light includes: a fixing device that fixes the optical fiber to at least one of a first position located more on an upstream side and a second position located more on a downstream side in a conveyance direction of the optical fiber than a laser light irradiating position of the optical fiber in a case of writing the grating; and a feeder having a structure capable of linearly reciprocating in the conveyance direction and adapted to feed a predetermined length of the optical fiber in the conveyance direction in a case where a fixed state of the optical fiber by the fixing device is released.

13 Claims, 7 Drawing Sheets

(52) U.S. Cl.
CPC ...... *G02B 6/02152* (2013.01); *G02B 6/02147* (2013.01); *G02B 2006/02161* (2013.01)

(56) References Cited

U.S. PATENT DOCUMENTS

| | | | | |
|---|---|---|---|---|
| 6,536,700 | B2 * | 3/2003 | Watson | ............... B65H 55/04 226/44 |
| 6,751,380 | B1 | 6/2004 | Imamura et al. | |
| 2001/0020375 | A1 * | 9/2001 | Novack | ............. G02B 6/02123 65/485 |
| 2004/0028331 | A1 | 2/2004 | Ishii et al. | |
| 2004/0218859 | A1 | 11/2004 | Yamashita et al. | |

FOREIGN PATENT DOCUMENTS

| | | | |
|---|---|---|---|
| CN | 1576912 | A | 2/2005 |
| CN | 103777270 | A | 5/2014 |
| CN | 104678486 | A | 6/2015 |
| CN | 105102232 | A | 11/2015 |
| JP | 10-239537 | A | 9/1998 |
| JP | 11-79792 | A | 3/1999 |
| JP | 11-337751 | A | 12/1999 |
| JP | 2000-89045 | A | 3/2000 |
| JP | 2002-333534 | A | 11/2002 |
| JP | 2003-4926 | A | 1/2003 |
| JP | 2003-139974 | A | 5/2003 |
| JP | 2003-518648 | A | 6/2003 |
| JP | 2003-202433 | A | 7/2003 |
| JP | 2004-55638 | A | 2/2004 |
| JP | 2006-99012 | A | 4/2006 |
| JP | 2008-242326 | A | 10/2008 |
| JP | 2010-235332 | A | 10/2010 |
| KR | 20030071159 | A | 9/2003 |
| KR | 101036324 | B1 | 5/2011 |
| WO | 01/48522 | A2 | 7/2001 |
| WO | 01/75496 | A1 | 10/2001 |

OTHER PUBLICATIONS

Office Action dated Sep. 18, 2019, issued in counterpart CN application No. 201680075222.7, with English translation. (8 pages).

* cited by examiner

MANUFACTURING DEVICE AND MANUFACTURING METHOD OF OPTICAL FIBER GRATING

CROSS-REFERENCE TO RELATED APPLICATIONS

The present patent application is a National Stage of International Application No. PCT/JP2016/087447, filed Dec. 15, 2016, which claims priority to Japanese Application No. 2016-062322, filed Mar. 25, 2016, both of which are incorporated herein by reference in their entireties.

TECHNICAL FIELD

The present invention relates to a manufacturing device and a manufacturing method of an optical fiber grating.

BACKGROUND ART

An optical fiber grating has a periodic refractive index variation (grating) written in a core of an optical fiber and is also called fiber Bragg grating (FBG). Such an optical fiber grating has a characteristic of reflecting only light having a wavelength (Bragg wavelength) according to a grating period, and is widely used in various fields such as a sensing field, a machining field, a communication field, and others.

As typical examples of a manufacturing method of an optical fiber grating, a phase mask method and a two-beam interference method can be exemplified. The phase mask method is a method in which a phase mask is arranged on a side of an optical fiber, and a grating is written in a core of the optical fiber by irradiating the core of the optical fiber with interference light of diffraction light (±1st order diffraction light) obtained by irradiating the phase mask with laser light in an ultraviolet region. Additionally, the two-beam interference method is a method in which a grating is written in a core of an optical fiber by branching laser light in an ultraviolet region into two beams and causing the branched beams of the laser light to interfere at a position of the core of the optical fiber.

Patent Document 1 to 6 below discloses a manufacturing device and a manufacturing method of an optical fiber grating in the related art. For example, the following Patent Document 1 discloses a manufacturing device in which laser light is emitted onto a coating of an optical fiber without removing the coating, and a grating is written by the laser light having passed through the coating. Additionally, the following Patent Document 2 discloses a manufacturing method in which laser light is emitted onto a coating of an optical fiber without removing the coating, and a grating is written by removing the coating by using the emitted laser light.

PRIOR ART DOCUMENTS

Patent Documents

| [Patent Document 1] | Japanese Unexamined Patent Application, First Publication No. 2007-114534 |
| [Patent Document 2] | Japanese Unexamined Patent Application, First Publication No. 2006-099012 |
| [Patent Document 3] | Japanese Unexamined Patent Application, First Publication No. 2004-055638 |
| [Patent Document 4] | Japanese Unexamined Patent Application, First Publication No. 2003-202433 |
| [Patent Document 5] | Japanese Unexamined Patent Application, First Publication No. 2000-089045 |
| [Patent Document 6] | Japanese Unexamined Patent Application, First Publication No. 2002-333534 |

DISCLOSURE OF INVENTION

Problems to be Solved by the Invention

Incidentally, even in a case of using either a phase mask method or a two-beam interference method described above, a length in which a grating can be written at one time is limited. When a plurality of such gratings is written along a longitudinal direction of an optical fiber, operation to feed a predetermined length of an optical fiber after writing a grating at a certain position of the optical fiber and operation to write a grating at a next position of the optical fiber are repeated. There may be a case where gratings are continuously written without any gap (without interruption) or written at constant intervals, but in either case, the above-described operation is repeated.

When a plurality of gratings is written in an optical fiber, it is necessary to: determine, with high accuracy, a position of an optical fiber phase mask and a position of each grating in a longitudinal direction of the optical fiber are determined with high accuracy; and prevent position displacement of the optical fiber during writing the gratings. For example, positioning accuracy of an optical fiber is required to be accuracy of a certain level such that a positional error with reference to a prescribed reference position is kept to several µm or less. The reason is that: when the positioning accuracy is insufficient, a gap may be generated between a grating previously written and a grating written next, or an overlapping portion between these gratings may be increased in a case of continuously writing gratings in the optical fiber, and consequently, characteristics of an optical fiber grating may be deteriorated. Particularly, in a case of continuously writing a plurality of gratings, continuity may be impaired by a gap generated between respective gratings and there may be influence of multiple reflection caused by overlapping of the gratings, and reflection light cannot be correctly measured.

It can be considered that a grating can be written by using manufacturing methods and the like disclosed in Patent Document 1 to 4 described above. However, positioning accuracy of an optical fiber is almost not considered in the Patent Document 1 to 4 described above, and therefore, it may be difficult to manufacture a plurality of optical fiber gratings arranged with high position accuracy in a fiber longitudinal direction. For example, in the above-described Patent Document 1, a position accuracy of ±1 cm or less is exemplary example of position accuracy in inserting an optical fiber in the longitudinal direction, and it may be difficult to continuously manufacturing gratings without any gap in the optical fiber with such accuracy.

The present invention has been made in view of the above-described circumstances, and provides a manufacturing device and a manufacturing method of an optical fiber grating in which positioning accuracy can be improved at the time of writing a grating, and an optical fiber grating having good characteristics can be manufactured as a result thereof.

Means for Solving the Problems

A first aspect of the present invention is a manufacturing device of an optical fiber grating writing a grating in a core of an optical fiber by irradiating the optical fiber with laser light, and the device includes: a fixing device adapted to fix the optical fiber to at least one of a first position located more on an upstream side and a second position located more on a downstream side in a conveyance direction of the optical fiber than a laser light irradiating position of the optical fiber in a case of writing the grating; and a feeder configured to be capable of linearly reciprocating in the conveyance direction and adapted to feed a predetermined length of the optical fiber in the conveyance direction in a case where a fixed state of the optical fiber by the fixing device is released.

According to a second aspect of the present invention, in the manufacturing device of an optical fiber grating according to the first aspect, the feeder includes: a fixed portion having a guide extending in the conveyance direction; a movable portion capable of reciprocating along the guide; and a holder attached to the movable portion and adapted to hold the optical fiber.

According to a third aspect of the present invention, in the manufacturing device of an optical fiber grating according to the second aspect, the feeder includes an irradiator attached to the movable portion and adapted to emit laser light.

According to a fourth aspect of the present invention, in the manufacturing device of an optical fiber grating according to the third aspect, the holder is configured to hold the optical fiber when the movable portion is moved in the conveyance direction, the movable portion is moved in a direction along a longitudinal direction of the optical fiber in a state where the holder does not hold the optical fiber, and the irradiator is configured to emit laser light to a phase mask arranged at the irradiating position.

According to a fifth aspect of the present invention, in the manufacturing device of an optical fiber grating according to any one of the first to fourth aspects, further provided are: an infeed device to feed the optical fiber; and a winder to wind up the optical fiber in which the grating has been written.

According to a sixth aspect of the present invention, in the manufacturing device of an optical fiber grating according to any one of the first to fifth aspects, further provided are: a first tension applicator arranged more on an upstream side than the first position and adapted to apply tension to be applied to the optical fiber; and a second tension applicator arranged more on a downstream side than the second position and adapted to apply tension to be applied to the optical fiber.

According to a seventh aspect of the present invention, in the manufacturing device of an optical fiber grating according to the sixth aspect, each of the first tension applicator and the second tension applicator includes: a pair of fixed pulleys where the optical fiber is passed around in a rotatably supported manner; and a movable pulley where the optical fiber is passed halfway around at a lower position between the pair of fixed pulleys.

According to an eighth aspect of the present invention, in the manufacturing device of an optical fiber grating according to the seventh aspect, each of the first tension applicator and the second tension applicator includes a load variable mechanism connected to the movable pulley and capable of adjusting a load applied to the optical fiber.

According to a ninth aspect of the present invention, in the manufacturing device of an optical fiber grating according to the eighth aspect, the load variable mechanism includes a load measuring mechanism to measure a load applied to the optical fiber and a load applying mechanism to apply a load to the optical fiber, and the load variable mechanism adjusts a load applied to the optical fiber by controlling the load applying mechanism in accordance with a measurement result of the load measuring mechanism.

A tenth aspect of the present invention is a manufacturing method of an optical fiber grating, including: fixing an optical fiber to at least one of a first position located more on an upstream side and a second position located more on a downstream side in a conveyance direction of the optical fiber than a laser light irradiating position of the optical fiber in order to write a grating in a core of the optical fiber; irradiating the irradiating position with the laser light; releasing a fixed state of the optical fiber at the first position and the second position; and feeding a predetermined length of the optical fiber in the conveyance direction by using a feeder having a structure capable of linearly reciprocating in the conveyance direction.

According to an eleventh aspect of the present invention, in the manufacturing method of an optical fiber grating according to the tenth aspect, the feeder is provided with an irradiator adapted to emit laser light, and further provided in the step of irradiating the laser light are: moving the feeder in a direction along a longitudinal direction of the optical fiber; and emitting the laser light from the irradiator to a phase mask arranged at the irradiating position.

According to a twelfth aspect of the present invention, in the manufacturing method of an optical fiber grating according to the tenth or eleventh aspect, further provided are: feeding an optical fiber having a length corresponding to the predetermined length from an infeed device to the first tension applicator arranged more on an upstream side than the first position and adapted to apply tension to the optical fiber before fixing the optical fiber; and also winding up the optical fiber by a winder from the second tension applicator arranged more on a downstream side than the second position and adapted to apply tension to the optical fiber.

According to a thirteenth aspect of the present invention further, in the manufacturing method of an optical fiber grating according to any one of the tenth to twelfth aspects, further provided is adjusting a load applied to the optical fiber during a period from when emission of the laser light is terminated until the optical fiber is started to be fixed again.

According to a fourteenth aspect of the present invention, in the manufacturing method of an optical fiber grating according to the thirteenth aspect, further provided in the step of adjusting a load are: measuring a load applied to the optical fiber; and controlling a load applied to the optical fiber in accordance with a measurement result of the load.

Effects of the Invention

According to the above-described aspects of the present invention, a grating is written by fixing an optical fiber to at least one of the first position located more on the upstream side and the second position located more on the downstream side in the conveyance direction of the optical fiber than the irradiating position of the laser light emitted to the optical fiber, and after a fixed state of the optical fiber at the first position and the second position are released, a predetermined length of the optical fiber is fed in the conveyance direction by the feeder having the structure capable of linearly reciprocating in the conveyance direction. Therefore, positioning accuracy can be improved at the time of writing a grating, and an optical fiber grating having good characteristics can be manufactured as a result thereof.

EMBODIMENTS FOR CARRYING OUT THE INVENTION

In the following, a manufacturing device and a manufacturing method of an optical fiber grating according to an embodiment of the present invention will be described in detail with reference to the drawings.

First Embodiment (Manufacturing Device of Optical Fiber Grating)

Figure 1:
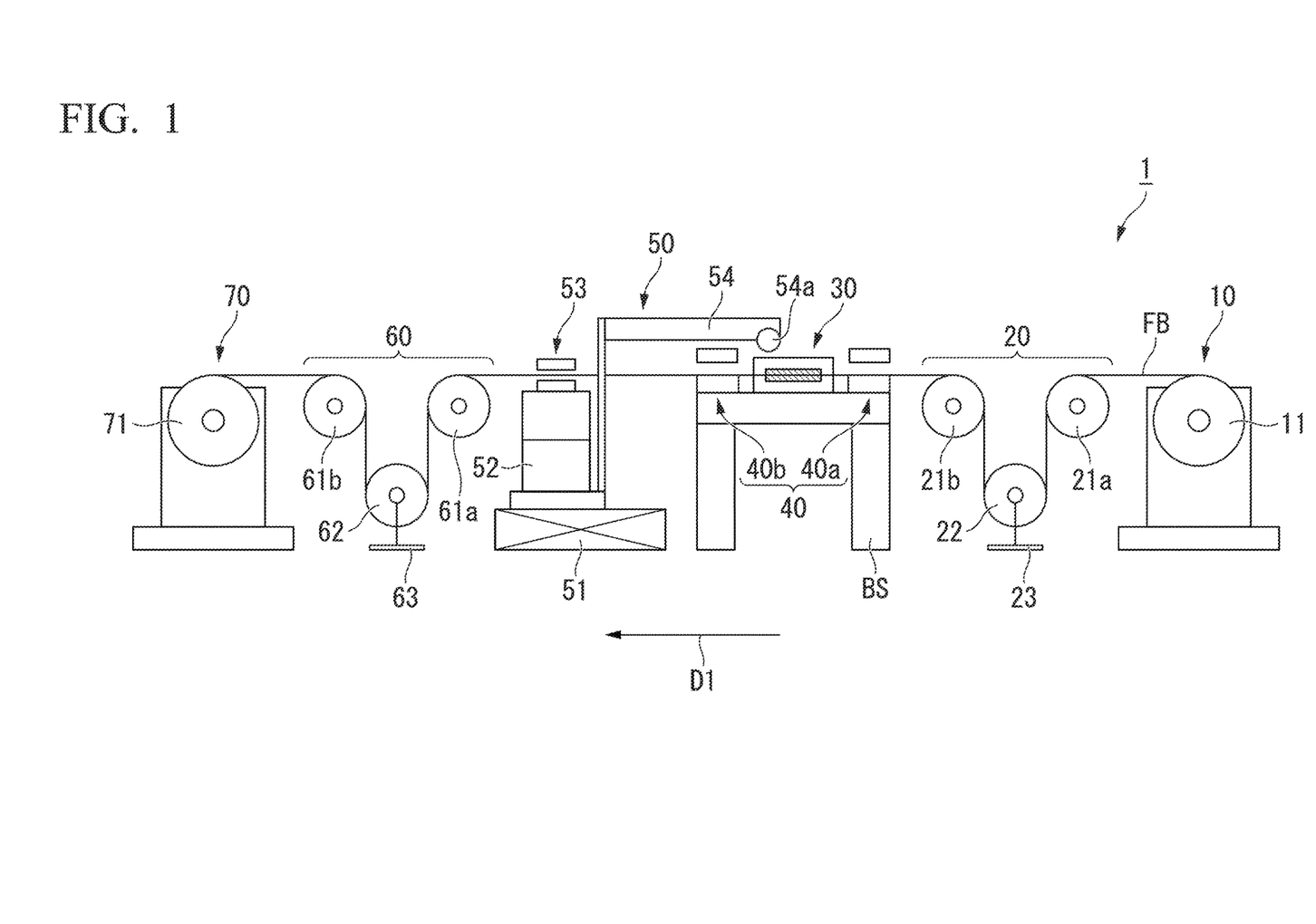
FIG. 1 is a drawing showing a structure of a manufacturing device of an optical fiber grating according to a first embodiment of the present invention.

FIG. 1 is a drawing showing a structure of a manufacturing device of an optical fiber grating according to a first embodiment of the present invention. As shown in FIG. 1, a manufacturing device 1 of an optical fiber grating according to the present embodiment includes an infeed device 10, a dancer unit 20 (first tension applicator), a mask unit 30, a clamp device 40 (fixing device), an optical fiber feeder 50 (feeder), a dancer unit 60 (second tension applicator), and a winder 70. The manufacturing device 1 writes a grating G (refer to FIG. 2) in a core C of an optical fiber FB while intermittently conveying the optical fiber FB in the conveyance direction D1 in FIG. 1.

The infeed device 10 is arranged at a most upstream position in the conveyance direction D1 of the optical fiber FB and feeds, under the control of a control device (not shown), the optical fiber FB where no grating G is written. For example, the infeed device 10 includes a reel 11 around which the optical fiber FB written with no grating G is wound, and a predetermined length of the optical fiber FB not written with any grating G is intermittently fed by rotating the reel 11 by a rotation amount commanded by the control device not shown. A feeding speed (line speed) in a case where the infeed device 10 feeds the optical fiber FB is, for example, approximately several m/min.

The optical fiber FB is, for example, an optical fiber (single core fiber) having a cylindrical core, a cylindrical clad covering a lateral surface of the core, and a cylindrical coating covering the lateral surface of the clad. The optical fiber FB may also be a multi-core fiber having a plurality of cores. Also, the optical fiber FB may be a single clad fiber or a double clad fiber. The single clad fiber is an optical fiber having one cylindrical clad covering the lateral surface of the core, and the double clad fiber is an optical fiber having a cylindrical clad (inner clad) covering the lateral surface of the core and a cylindrical clad (outer clad) covering a lateral surface of the inner clad. Additionally, the optical fiber FB may not be necessarily provided with a coating.

The dancer unit 20 is installed more on a downstream side (downstream side in the conveyance direction D1 of the optical fiber FB) than an installation position of the infeed device 10, and applies constant tension to the optical fiber FB on an upstream side of the mask unit 30. Specifically, the dancer unit 20 includes: a pair of fixed pulleys 21a, 21b where the optical fiber FB are passed around in a rotatably supported manner; and a movable pulley 22 where the optical fiber FB is passed halfway around at a lower position between the fixed pulleys 21a, 21b. The optical fiber FB fed from the infeed device 10 is passed around the fixed pulley 21a, movable pulley 22, and fixed pulley 21b in this order.

While positions of the fixed pulleys 21a, 21b are fixed, a position of the movable pulley 22 is changeable in a vertical direction (vertical up-down direction). Specifically, the movable pulley 22 is moved downward or moved upward in accordance with feeding operation of the optical fiber FB by the infeed device 10 and feeding operation of the optical fiber FB in the conveyance direction D1 by the optical fiber feeder 50. A tray 23 is provided for the movable pulley 22, and tension applied to the optical fiber FB can be changed by changing a weight placed on the tray 23. The tension applied to the optical fiber FB is tension corresponding to half weight of weight obtained by adding the movable pulley 22, the tray 23, and weight of a weight placed on the tray 23.

The above-described dancer unit 20 is provided to precisely control the tension applied to the optical fiber FB at the time of writing a grating G in the optical fiber FB. In other words, when a grating G is written in a state where the optical fiber FB is in a stretched state or a contracted state due to fluctuation of the tension, a grating G having a period different from an inherent period is written. To avoid such a situation, the dancer unit 20 precisely controls the tension applied to the optical fiber FB. For example, in a quartz optical fiber having a clad diameter of 125 μm, a Bragg wavelength is changed by approximately 17 pm due to fluctuation of the tension of 1 gf, and therefore, it is necessary to suppress fluctuation of the tension to several gf or less in order to manufacture an optical fiber grating having good characteristics. 1 gf is approximately $9.81 \times 10^{-3} N$.

The mask unit 30 is installed more on the downstream side than an installation position of the dancer unit 20, and is a unit to write a grating G in the core C of the optical fiber FB by irradiating the optical fiber FB with laser light. The mask unit 30 is mounted on a base BS. The mask unit 30 includes a phase mask M (refer to FIG. 2) arranged on a lateral side of the optical fiber FB conveyed in the conveyance direction D1, and writes a grating G in the core C of the optical fiber FB by irradiating the core of the optical fiber with interference light of diffraction light (±1st order diffraction light) obtained by irradiating the phase mask with laser light in an ultraviolet region.

Figure 2:
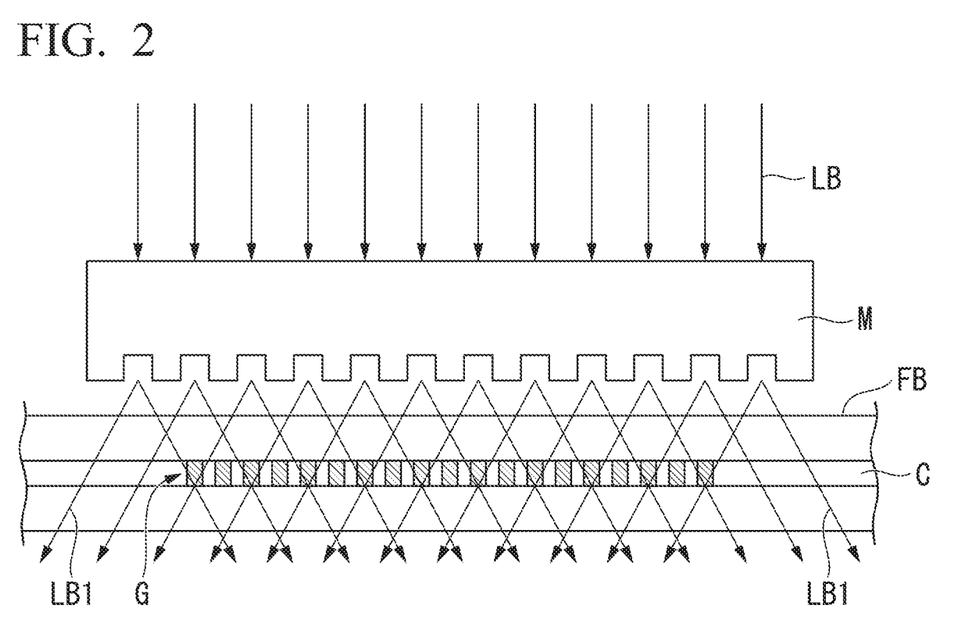
FIG. 2 is a drawing to describe a grating writing method using a phase mask according to the first embodiment of the present invention.

FIG. 2 is a drawing to describe a grating writing method using a phase mask according to the first embodiment of the present invention. As shown in FIG. 2, the phase mask M is provided on the lateral side of the optical fiber FB conveyed in the conveyance direction D1 (upper side of the optical fiber FB in the example shown in FIG. 2) at a prescribed interval on a side surface of the optical fiber FB. In the mask unit 30, the phase mask M is irradiated with laser light LB in the ultraviolet region. Consequently, sub beams LB1 corresponding to +1st order diffraction light and −1st order diffraction light are generated, and interference light of these sub beams LB1 is emitted to the core C of the optical fiber FB, thereby writing a grating G in the core C of the optical fiber FB. As the laser light LB to be emitted to the phase mask M, for example, laser light having a wavelength of approximately 240 to 360 nm emitted from an excimer laser can be used, and an energy density thereof is, for example, approximately 5 to 15 W/cm².

Similar to the mask unit 30, the clamp device 40 is mounted on the base BS and fixes the optical fiber FB under the control of the control device (not shown) in a case of writing a grating G in the core C of the optical fiber FB. The clamp device 40 is provided in order to manufacture an optical fiber grating having good characteristics while preventing positional displacement of the optical fiber FB during writing a grating G.

Specifically, the clamp device 40 includes two clampers 40a and 40b. The clamper 40a is installed at a predetermined position (first position) located more on the upstream side than the mask unit 30 (upstream side in the conveyance direction D1 of the optical fiber FB) and also more on the downstream side than the dancer unit 20. The clamper 40b is installed at a predetermined position (second position) located more on the downstream side than the mask unit 30 and also more on the upstream side than the optical fiber feeder 50. Specific installation positions of the clampers 40a, 40b are suitably set considering, for example, positioning accuracy of the optical fiber FB.

The optical fiber feeder 50 is installed more on the downstream side than installation positions of the mask unit 30 and the clamp device 40. The optical fiber feeder 50 has a structure capable of linearly reciprocating in the conveyance direction D1 and feeds a predetermined length of the optical fiber FB in the conveyance direction D1 under the control of the control device (not shown) in a case where a fixed state of the optical fiber FB by the clamp device 40 is released. For example, in a case of continuously writing gratings G in the optical fiber FB without any gap (without interruption), the optical fiber feeder 50 feeds, in the conveyance direction D1, the optical fiber FB by an amount corresponding to the length in the conveyance direction D1 of the phase mask M. A speed (line speed) in a case where the optical fiber feeder 50 feeds the optical fiber FB in the conveyance direction D is, for example, approximately several m/min.

The optical fiber feeder 50 includes a fixed stage 51 (fixed portion), a movable stage 52 (movable portion), a clamper 53 (holder), and an irradiation unit 54 (irradiator). The fixed stage 51 includes a linear guide extending in the conveyance direction D1, and is installed on a floor surface, for example. The movable stage 52 is capable of reciprocating along the guide of the fixed stage 51 (in the conveyance direction of the optical fiber FB). Resolution (positioning accuracy) of the optical fiber feeder 50 is approximately several μm or less. The movable stage 52 may also include a first stage movable along the guide of the fixed stage 51 and a second stage rotatable around an axis extending in a vertical direction with respect to the first stage.

The clamper 53 is attached to a position above the movable stage 52 and holds (fixes) the optical fiber FB under the control of a control device not shown. Specifically, the clamper 53 clamps the optical fiber FB when the movable stage 52 is moved in the conveyance direction D1 (when the optical fiber FB is fed in the conveyance direction D1). In a case where the optical fiber FB is not fed in the conveyance direction D1 by the optical fiber feeder 50, the optical fiber FB is not held by the clamper 53.

The irradiation unit 54 includes a mirror that reflects light from an excimer laser that emits laser light having a wavelength of, for example, approximately 240 to 360 nm, and emits laser light LB (refer to FIG. 2) in a direction substantially perpendicular to the phase mask M from the emitter 54a. The irradiation unit 54 is attached to the movable stage 52, and irradiates the phase mask M provided in the mask unit 30 with laser light LB when the movable stage 52 is moved in a direction opposite to the conveyance direction D1 of the optical fiber FB. Since the width (length in the conveyance direction D1) of the laser light LB emitted to the phase mask M is shorter than the length in the conveyance direction D1 of the phase mask M, an entire face of the phase mask M is irradiated with the laser light LB by irradiating the phase mask M with the laser light LB while moving the irradiation unit 54. Thus, when the movable stage 52 is moved in the direction opposite to the conveyance direction D1 of the optical fiber FB, unnecessary movement of the movable stage 52 is eliminated by irradiating the phase mask M with the laser light LB, and therefore, production efficiency can be improved. The excimer laser may be provided in the irradiation unit 54, or may be prepared in a different place in a case of using a mirror. The width (length in the conveyance direction D1) of the laser light LB emitted from the irradiation unit 54 is, for example, approximately 5 mm, and a moving speed of the laser light LB during irradiation is, for example, approximately 0.5 to 2 mm/sec.

Thus, the optical fiber FB is fed in the conveyance direction D1 by using the optical fiber feeder 50, thereby improving positioning accuracy of the optical fiber FB at the time of writing the grating G. Positioning can be performed with accuracy of a certain level also by controlling a rotation amount of each of the reel 11 in the infeed device 10 and a reel 71 (described later) in the winder 70. However, the rotation amount is needed to be controlled considering a winding diameter and the like of the optical fiber FB in accordance with the number of turns in each of the reels 11, 71, and it may be difficult to achieve equivalent positioning accuracy achieved by the optical fiber feeder 50. Since the irradiation unit 54 is attached to the movable stage 52 of the optical fiber feeder 50, mutual position displacement can be more reduced compared with a case where a fiber feeder and an irradiation unit are driven at separate stages, and positioning of the irradiation unit 54 can also be performed with high accuracy.

The dancer unit 60 is installed more on the downstream side than the installation position of the optical fiber feeder 50, and applies constant tension to the optical fiber FB on the downstream side of the mask unit 30. Specifically, the dancer unit 60 has a structure similar to that of the dancer unit 20, and includes: a pair of fixed pulleys 61a, 61b where an optical fiber FB is passed around in a rotatably supported manner; and a movable pulley 62 where the optical fiber FB is passed halfway around at a lower position between the fixed pulleys 61a, 61b. The optical fiber FB is passed around the fixed pulley 61a, movable pulley 62, and fixed pulley 61b in this order.

While positions of the fixed pulleys 61a, 61b are fixed, a position of the movable pulley 62 is changeable in a vertical direction (vertical up-down direction). Specifically, the movable pulley 62 is moved downward or moved upward in accordance with feeding operation of the optical fiber FB in the conveyance direction D1 by the optical fiber feeder 50 and winding operation of the optical fiber FB by the winder 70. A tray 63 is provided for the movable pulley 62, and tension applied to the optical fiber FB can be changed by changing a weight placed on the tray 63. The tension applied to the optical fiber FB is tension corresponding to half weight of weight obtained by adding the movable pulley 62, the tray 63, and weight of a weight placed on the tray 63. The reason for providing such a dancer unit 60 is similar to the reason for providing the dancer unit 20.

The winder 70 is arranged at a most downstream position in the conveyance direction D1 of the optical fiber FB and winds up, under the control of a control device (not shown), the optical fiber FB in which a grating G has been written. For example, the winder 70 includes the reel 71 similar to the reel 11 provided in the infeed device 10, and intermittently winds up a constant length of the optical fiber FB written with the grating G by rotating the reel 71 by a rotation amount commanded by the control device not shown. A winding speed (line speed) in a case where the winder 70 winds up the optical fiber FB is, for example, approximately several m/min.

(Manufacturing Method of Optical Fiber Grating)

Figure 3:
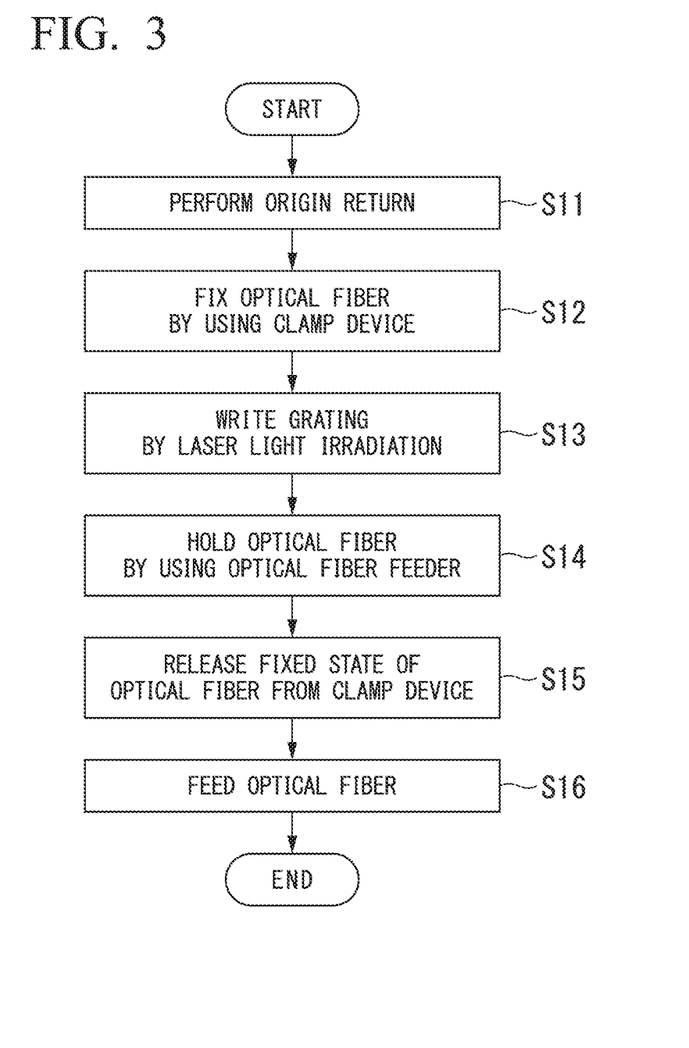
FIG. 3 is a flowchart showing an exemplary manufacturing method of an optical fiber grating according to the first embodiment of the present invention.
Figure 4:
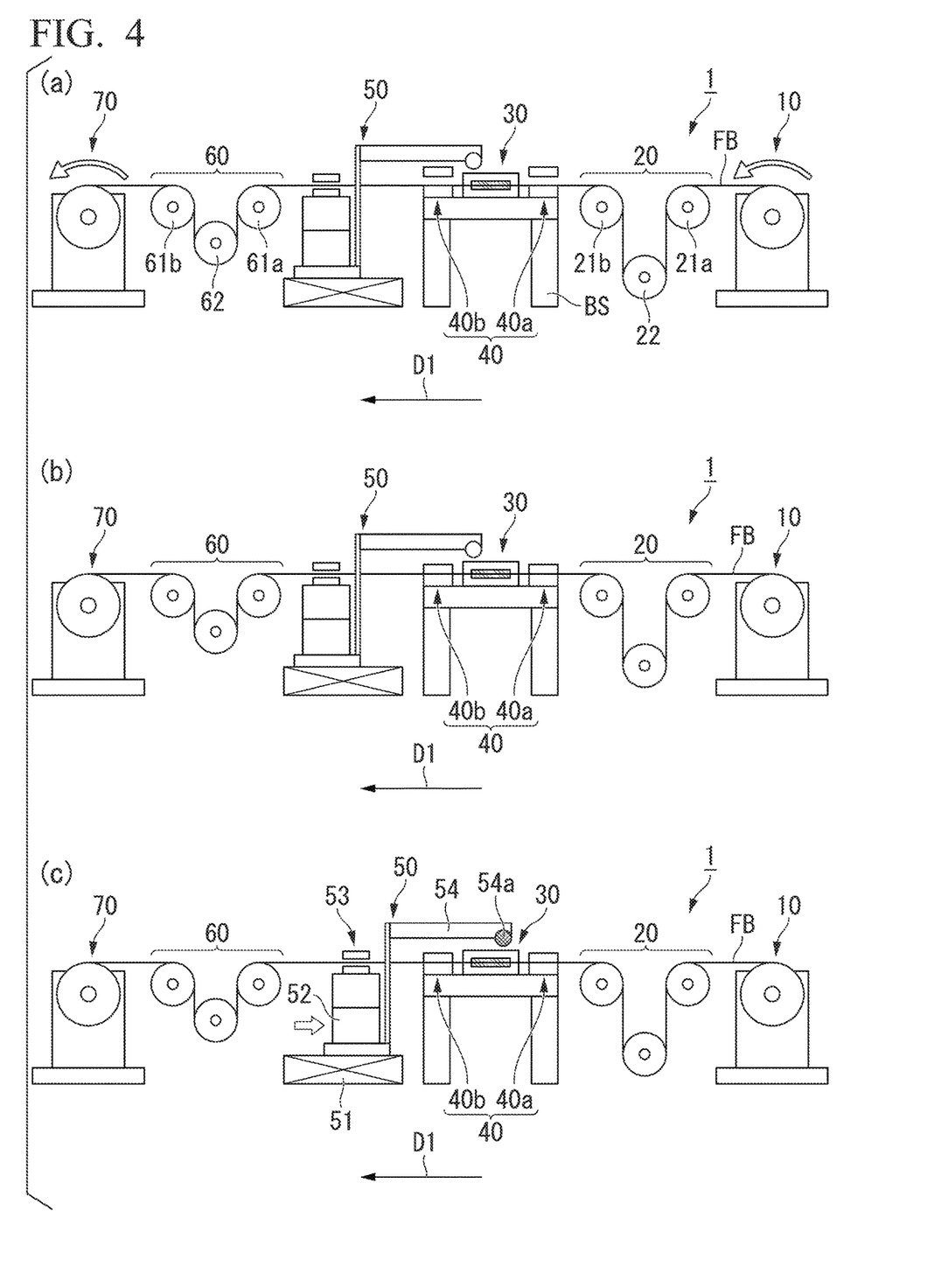
FIG. 4 is a drawing showing each state of the manufacturing device of a fiber grating at the time of manufacturing an optical fiber grating.
Figure 5:
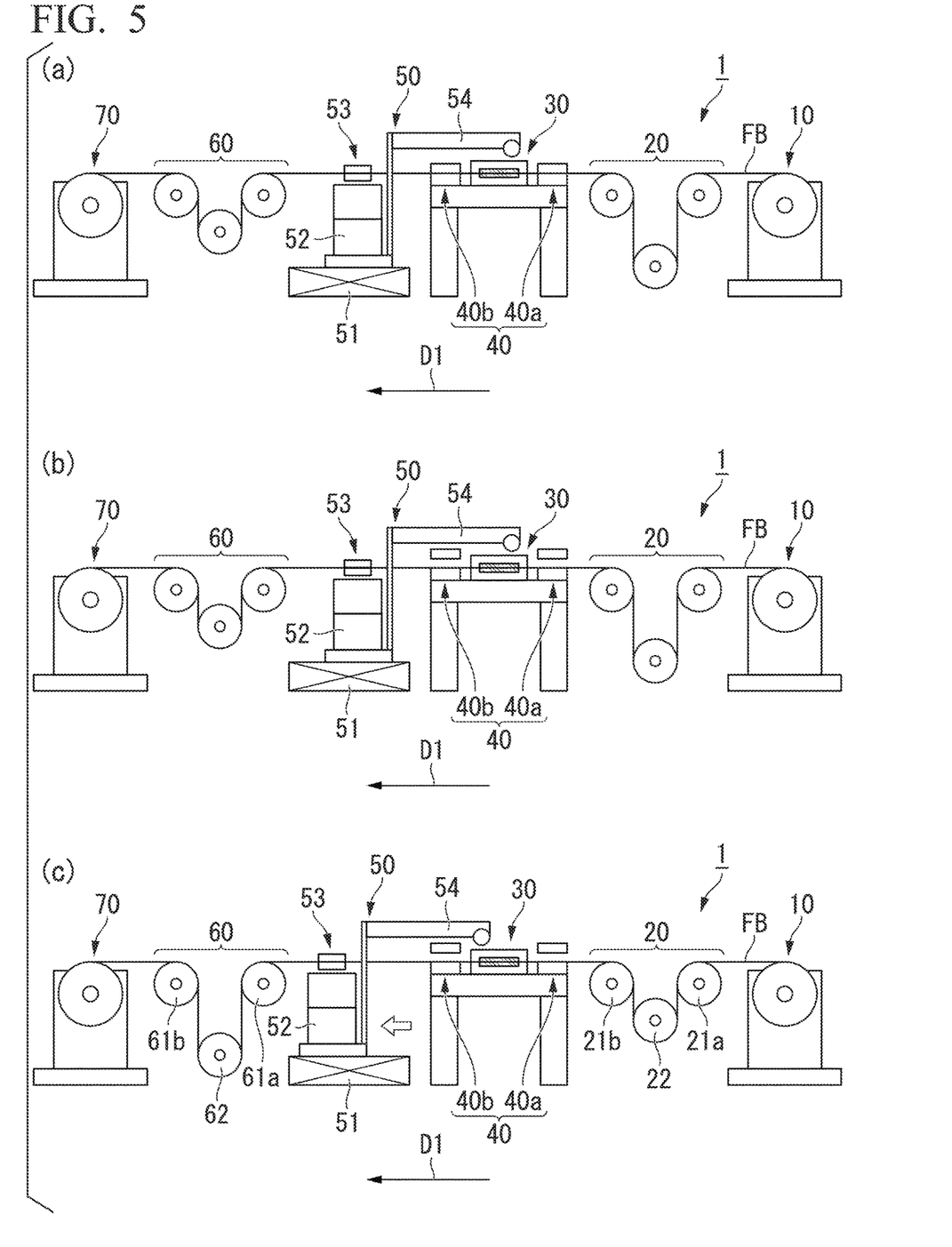
FIG. 5 is a drawing showing each state of the manufacturing device of a fiber grating at the time of manufacturing an optical fiber grating.

FIG. 3 is a flowchart showing an exemplary manufacturing method of an optical fiber grating according to the first embodiment of the present invention. FIGS. 4 and 5 are drawings showing each state of a manufacturing device of a fiber grating at the time of manufacturing an optical fiber grating. Processing in the flowchart shown of FIG. 3 is started by start of manufacturing of an optical fiber grating, and repeatedly executed until the manufacturing of an optical fiber grating is terminated. In FIGS. 4 and 5, illustration of the trays 23, 63 provided in the dancer units 20, 60 are omitted. Hereinafter, a description will be provided, for easy understanding, with an exemplary case where gratings G each having a same Bragg wavelength are continuously written in an optical fiber FB without any gap (without interruption).

When manufacturing of an optical fiber grating is started, origin return is performed first (step S11). Here, the origin return represents operation in which the manufacturing device 1 of a fiber grating is brought into an initial state (state shown in Part (a) of FIG. 4) in order to write gratings G in the optical fiber FB. In the origin return, the infeed device 10 and the winder 70 are controlled by the control device (not shown) provided in the manufacturing device 1 of a fiber grating, and a predetermined length of the optical fiber FB is fed from the infeed device 10 and a predetermined length of the optical fiber FB is wound up by the winder 70. The length of the optical fiber FB fed from the infeed device 10 and the length of the optical fiber FB wound up by the infeed device 10 are, for example, the length in the conveyance direction D1 of the phase mask M (e.g., approximately several tens to hundreds mm).

Specifically, a constant length of the optical fiber FB is fed from the infeed device 10 to the dancer unit 20 at a constant speed (e.g., speed of approximately several m/min). Consequently, as shown in Part (a) of FIG. 4, the movable pulley 22 provided in the dancer unit 20 is moved downward by an amount in accordance with a length of the optical fiber FB fed from the infeed device 10 (precisely, a half distance of the fed length). Even when the constant length of the optical fiber FB is fed from the infeed device 10, the movable pulley 22 is controlled so as not to contact the floor surface (floor surface on which the infeed device 10, base SB, and the like are installed).

Additionally, the constant length of the optical fiber FB passed around the dancer unit 60 is wound up by the winder 70 at the constant speed (e.g., speed of approximately several m/min). Consequently, as shown in Part (a) of FIG. 4, the movable pulley 62 provided in the dancer unit 60 is moved upward by an amount in accordance with the length of the optical fiber FB wound up by the winder 70 (precisely, a half distance of the wound-up length). Even when the constant length of the optical fiber FB is wound up by the winder 70, the movable pulley 62 is controlled so as to be located below the fixed pulleys 61a, 61b without contacting these fixed pulleys.

Next, as shown in Part (b) of FIG. 4, the optical fiber FB is fixed by the clamp device 40 (step S12: first step). Specifically, the clamp device 40 is controlled by the control device (not shown) provided in the manufacturing device 1 of a fiber grating, the optical fiber FB is clamped by the clamper 40a and also the optical fiber FB is clamped by the clamper 40b. Consequently, the optical fiber FB is fixed at a position (first position) located more on the upstream side than the mask unit 30 and at a position (second position) located more on the downstream side than the mask unit 30.

Next, a step to write a grating G in the core C of the optical fiber FB by irradiating the phase mask M of the mask unit 30 with laser light LB is performed (step S13: second step). Specifically, the optical fiber feeder 50 and the irradiation unit 54 are controlled by the control device (not shown) provided in the manufacturing device 1 of a fiber grating, and as shown in Part (c) of FIG. 4, the laser light LB is emitted from the irradiation unit 54 while the movable stage 52 is moved (moved at the constant speed in a direction opposite to the conveyance direction D1 of the fiber FB).

The clamper 53 provided in the optical fiber feeder 50 is in a state of not holding the optical fiber FB.

While the irradiation unit 54 is conveyed by the movable stage 52 at the constant speed in the direction opposite to the conveyance direction D1 of the optical fiber FB, the laser light LB emitted from the emitter 54a of the irradiation unit 54 is emitted to the phase mask M so as to scan the phase mask M provided in the mask unit 30. When the laser light LB is emitted to the phase mask M, sub beams LB1 corresponding to +1st order diffraction light and −1st order diffraction light are generated (refer to FIG. 2), and interference light of these sub beams LB1 is emitted to the core C of the optical fiber FB, thereby writing a grating G in the core C of the optical fiber FB. A moved distance of the movable stage 52 at the time of writing the grating G is almost same as the length in the conveyance direction D1 of the phase mask M (e.g., approximately 100 mm), and emission of the laser light LB from the irradiation unit 54 is stopped after completion of movement.

Subsequently, as shown in Part (a) of FIG. 5, the optical fiber FB is held by the optical fiber feeder 50 (step S14). Specifically, the optical fiber feeder 50 is controlled by the control device (not shown) provided in the manufacturing device 1 of a fiber grating, and the optical fiber FB is clamped by the clamper 53. Consequently, the optical fiber FB is fixed by the clamp device 40 and held by the clamper 53 of the optical fiber feeder 50.

After that, as shown in Part (b) of FIG. 5, the fixed state of the optical fiber FB by the clamp device 40 is released (step S15: third step). Specifically, the clamp device 40 is controlled by the control device (not shown) provided in the manufacturing device 1 of a fiber grating, the clamped state of the optical fiber FB by the clamper 40a is released, and also the clamped state of the optical fiber FB by the clamper 40b is released.

When the fixed state of the optical fiber FB by the clamp device 40 is released, the constant length of the optical fiber FB is fed in the conveyance direction D1 by the optical fiber feeder 50 (step S16: fourth step). Specifically, the optical fiber feeder 50 is controlled by the control device (not shown) provided in the manufacturing device 1 of a fiber grating, and the movable stage 52 is moved in the conveyance direction D1 of the optical fiber FB at the constant speed as shown in Part (c) of FIG. 5.

Here, the optical fiber FB is in a state held by the clamper 53 provided in the optical fiber feeder 50. Therefore, the optical fiber FB is conveyed in the conveyance direction D1 together with movement of the movable stage 52. The length of the optical fiber FB fed by the optical fiber feeder 50 is the length in the conveyance direction D1 of the phase mask M (e.g., approximately several tens to hundreds mm), and the speed at which the optical fiber FB is fed by the optical fiber feeder 50 is, for example, approximately several m/min.

When feeding operation of the optical fiber FB by the optical fiber feeder 50 is completed, as shown in Part (c) of FIG. 5, the movable pulley 22 provided in the dancer unit 20 is moved upward by an amount in accordance with the length of the optical fiber FB fed by the optical fiber feeder 50 (precisely, a half distance of the fed length). On the other hand, as shown in Part (c) of FIG. 5, the movable pulley 62 provided in the dancer unit 60 is moved downward by an amount in accordance with the length of the optical fiber FB fed by the optical fiber feeder 50 (precisely, a half distance of the fed length).

When the feeding operation of the optical fiber FB is completed, the held state by the clamper 53 is released, and origin return is performed again (step S11). After that, the processing in the flowchart shown of FIG. 3 is repeatedly executed. With the above described processing, gratings G each having the same Bragg wavelength are sequentially written in the core C of the optical fiber FB while intermittently conveying the optical fiber FB in the conveyance direction D1 in FIG. 1. The processing in the flowchart shown in FIG. 3 is repeatedly executed until manufacturing of the optical fiber gratings is terminated.

As described above, in the present embodiment, the optical fiber FB is fixed by the clamp device 40 at the position (first position) located more on the upstream side than the mask unit 30 and at the position (second position) located more on the downstream side than the mask unit 30, and a grating G is written in the core C of the optical fiber FB by irradiating the phase mask M of the mask unit 30 with laser light LB. Furthermore, after the fixed state of the optical fiber FB by the clamp device 40 is released, the constant length of the optical fiber FB is fed in the conveyance direction D1 by the optical fiber feeder 50. Therefore, positioning accuracy and the like at the time of writing a grating G can be improved, and an optical fiber grating having good characteristics can be manufactured as a result thereof. Furthermore, in the present embodiment, the state in which constant tension is applied to the optical fiber FB is maintained by the dancer units 20, 60 during conveyance. Therefore, variations of the Bragg wavelength among respective gratings G can be reduced.

Second Embodiment (Manufacturing Device of Optical Fiber Grating)

Figure 6:
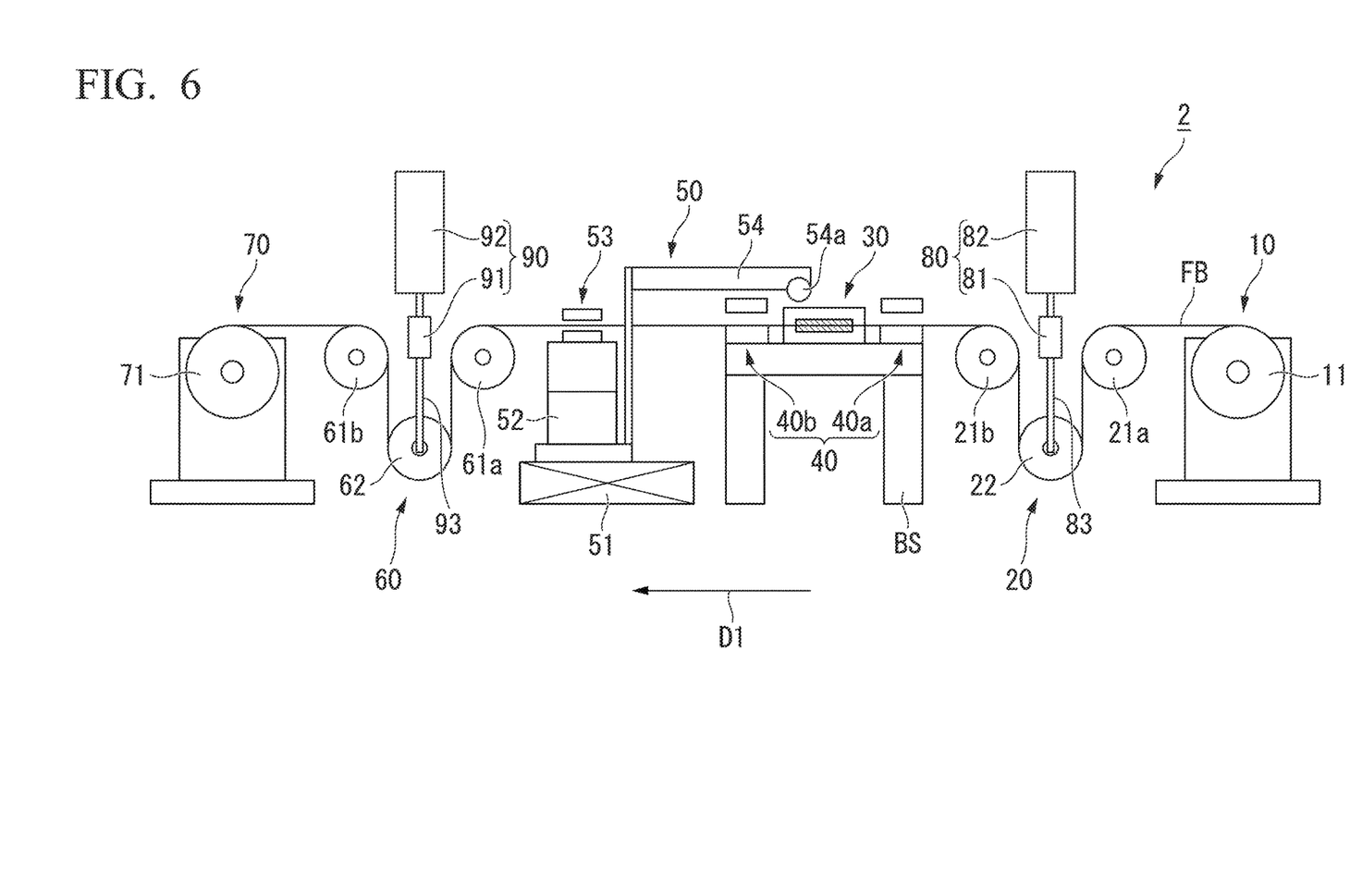
FIG. 6 is a drawing showing a structure of a manufacturing device of an optical fiber grating according to a second embodiment of the present invention.

FIG. 6 is a drawing showing a structure of a manufacturing device of an optical fiber grating according to a second embodiment of the present invention. As shown in FIG. 6, a manufacturing device 2 of an optical fiber grating according to the present embodiment has a structure in which trays 23, 63 of dancer units 20, 60 provided in a manufacturing device 1 of an optical fiber grating shown in FIG. 1 are omitted and load variable mechanisms 80, 90 are provided in the dancer units 20 and 60, respectively.

The manufacturing device 2 of an optical fiber grating having the above-described structure enables not only highly accurate positioning of an optical fiber FB but also precise control of tension applied to the optical fiber FB, and therefore, a grating G having better characteristics than the manufacturing device 1 of an optical fiber grating according to a first embodiment can be manufactured. For example, in a case of continuously writing gratings G each having a same Bragg wavelength, a deviation of the Bragg wavelength is prevented from occurring, and in a case of writing gratings G each having a varied Bragg wavelength, the Bragg wavelength is controlled to be varied with high accuracy.

The load variable mechanism 80 includes a load measuring mechanism 81 and a load applying mechanism 82 and is arranged above a movable pulley 22 and adjusts a load applied to the optical fiber FB via the movable pulley 22. Specifically, the load variable mechanism 80 is connected to a rotary shaft of the movable pulley 22 such that the movable pulley 22 can be rotated, and adjusts a load applied to the optical fiber FB by pushing down the movable pulley 22 or pushing up the movable pulley 22.

The load measuring mechanism 81 is attached to a drive shaft 83 of the load applying mechanism 82 connected to the movable pulley 22, and measures a load applied to the optical fiber FB. As the load measuring mechanism 81, a load cell can be used, for example. The load applying mechanism 82 applies a load to the optical fiber FB. As the load applying mechanism 82, an air cylinder driven under the control of a solenoid valve can be used, for example. The load variable mechanism 80 controls the load applying mechanism 82 such that, for example, a load (tension to the optical fiber FB) measured by the load measuring mechanism 81 becomes constant. The load applying mechanism 82 is only required to be electrically controllable, and can be substituted by, for example, a single axis actuator or the like.

Similar to the load variable mechanism 80, the load variable mechanism 90 includes a load measuring mechanism 91 and a load applying mechanism 92, is arranged above a movable pulley 62, and adjusts a load applied to an optical fiber FB via the movable pulley 62. Specifically, similar to the load variable mechanism 80, the load variable mechanism 90 is connected to a rotary shaft of the movable pulley 62 such that the movable pulley 62 can be rotated, and adjusts a load applied to the optical fiber FB by pushing down the movable pulley 62 or pushing up the movable pulley 62.

The load measuring mechanism 91 and the load applying mechanism 92 are similar to the load measuring mechanism 81 and the load applying mechanism 82, respectively. The load measuring mechanism 91 is attached to a drive shaft 93 of the load applying mechanism 92 connected to the movable pulley 62. As the load measuring mechanism 91, a load cell can be used, for example, and as the load applying mechanism 92, an air cylinder driven under the control of a solenoid valve can be used, for example. Similar to the load variable mechanism 80, the load variable mechanism 90 also controls the load applying mechanism 92 such that, for example, a load (tension to the optical fiber FB) measured by the load measuring mechanism 91 becomes constant. The load applying mechanism 92 is only required to be electrically controllable, and can be substituted by, for example, a single axis actuator or the like.

In the present embodiment, an optical fiber feeder 50 can adjust a feeding amount of the optical fiber FB in the conveyance direction D1 in accordance with a load (tension) applied to the optical fiber FB by each of the load variable mechanisms 80, 90. This compensates a change in a stretched amount of the optical fiber FB caused in a case of varying a load applied to the optical fiber FB by each of the load variable mechanisms 80, 90, and gratings G keeping continuity and having good characteristics can be manufactured.

(Manufacturing Method of Optical Fiber Grating)

Figure 7:
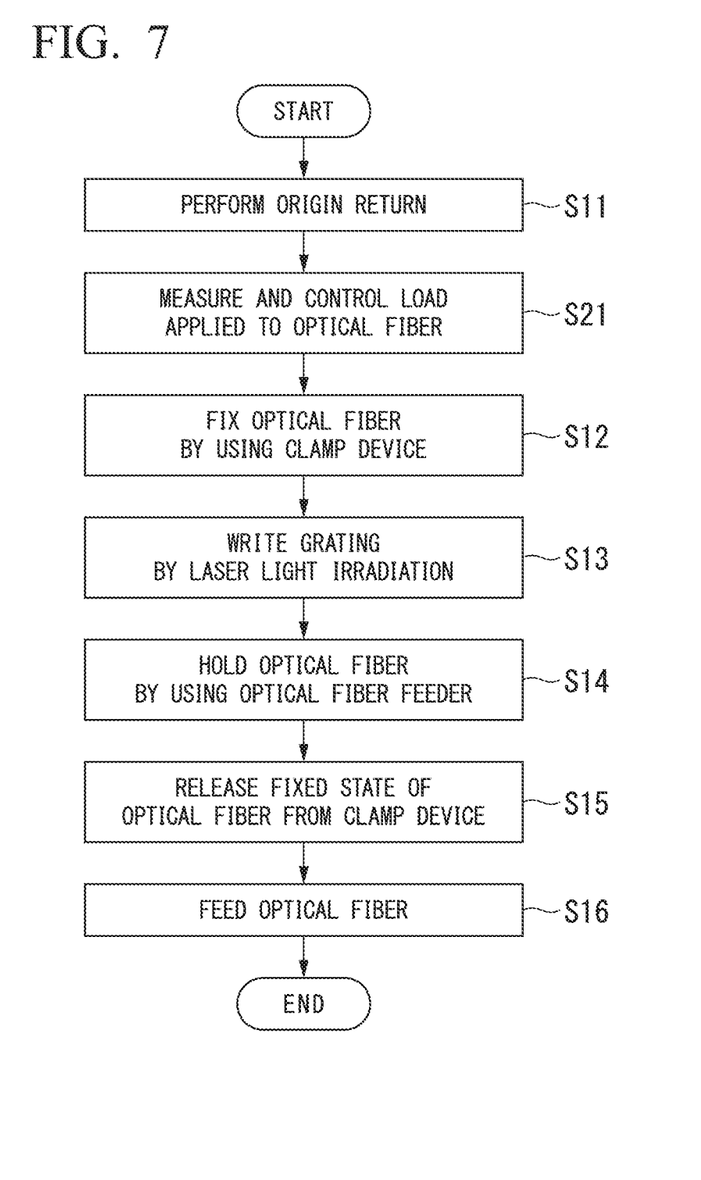
FIG. 7 is a flowchart showing an exemplary manufacturing method of an optical fiber grating according to the second embodiment of the present invention.

FIG. 7 is a flowchart showing an exemplary manufacturing method of an optical fiber grating according to the second embodiment of the present invention. Similar to processing in a flow chart shown in FIG. 3, processing in the flowchart shown in FIG. 7 is started by start of manufacturing of an optical fiber grating, and repeatedly executed until the manufacturing of the optical fiber grating is terminated. In the following description, a description will be provided, for easy understanding, by exemplifying a case of continuously writing gratings G each having a same Bragg wavelength in an optical fiber FB without any gap (without interruption) in a manner similar to the first embodiment.

The flowchart shown in FIG. 7 differs from the flowchart shown in FIG. 3 in that processing in step S21 is provided between processing in step S11 and processing in step S12 in the flowchart shown in FIG. 7. When manufacturing of an optical fiber grating is started, origin return is first performed similar to the first embodiment (step S11). When the origin return is completed, processing to measure a load to the optical fiber FB and control the load to the optical fiber FB in accordance with a measurement result is performed by the load variable mechanisms 80, 90 (step S21).

Here, as described above, assumed is the case where the gratings G each having the same Bragg wavelength are continuously written in the optical fiber FB without any gap (without interruption). Therefore, for example, in the load variable mechanism 80, the load applying mechanism 82 is controlled such that the load measured by the load measuring mechanism 81 becomes a prescribed load, and in the load variable mechanism 90, the load applying mechanism 92 is controlled such that the load measured by the load measuring mechanism 91 becomes a prescribed load.

When the processing to control the load applied to the optical fiber FB is completed, the optical fiber FB is fixed by a clamp device 40 (step S12: first step) in a manner similar to the first embodiment, and a step to write a grating G in a core C of the optical fiber FB by irradiating a phase mask M of a mask unit 30 with laser light LB is performed (step S13: second step). When writing the grating G is completed, the optical fiber FB is held by the optical fiber feeder 50 (step S14), and sequentially the fixed state of the optical fiber FB by the clamp device 40 is released (step S15: third step). Subsequently, a constant length of the optical fiber FB is fed in the conveyance direction D1 by the optical fiber feeder 50 (step S16: fourth step).

When the above processing is completed, the held state by the clamper 53 is released, and the origin return is performed again (step S11). After that, the processing in the flowchart shown of FIG. 7 is repeatedly executed. With the above described processing, gratings G each having the same Bragg wavelength are sequentially written in the core C of the optical fiber FB while intermittently conveying the optical fiber FB in the conveyance direction D1 in FIG. 1 and keeping the constant tension to the optical fiber FB. The processing in the flowchart shown in FIG. 7 is repeatedly executed until manufacturing of the optical fiber grating is terminated.

In the above-described embodiment, described is the example provided with the processing in step S21 (processing to measure a load applied to the optical fiber FB and control the load applied to the optical fiber FB in accordance with the measurement result) between step S11 and step S12 shown in FIG. 7. However, the processing in step S21 can be performed at any timing during a period from termination of the step of writing a grating G in the core C of the optical fiber FB by irradiating the phase mask M of the mask unit 30 with the laser light LB (step S13) until next fixation of the optical fiber FB by the clamp device 40 (step S12).

Furthermore, in the above-described embodiment, the example is described in which the gratings G each having the same Bragg wavelength are continuously written in the optical fiber FB without any gap (without interruption) by controlling a measured load to become a prescribed load in each of the load variable mechanisms 80, 90. However, every time the processing in step S21 is performed, different loads may be applied to the optical fiber FB by the load variable mechanisms 80, 90. Consequently, gratings G having Bragg wavelengths varied stepwisely can be written, for example. In a case where a load applied to the optical fiber FB is varied by each of the load variable mechanisms 80 and 90, a feeding amount of the optical fiber FB in the conveyance direction D1 can be adjusted in accordance with a varied amount of the load in order to compensate change in the stretched amount of the optical fiber FB.

As described above, in the present embodiment, application adjustment to an optical fiber FB is controlled by the load variable mechanisms 80, 90 during a period from termination of writing one grating G by irradiating the phase mask M with laser light LB until start of writing a next grating G (precisely, until a next optical fiber FB is fixed by the clamp device 40). Therefore, even gratings G each having a same Bragg wavelength or even a plurality of gratings G having different Bragg wavelengths can be manufactured with high accuracy.

Additionally, in the present embodiment, similar to the first embodiment, a grating G is written in the core C of the optical fiber FB by irradiating the phase mask M of the mask unit 30 with laser light LB in a state where the optical fiber FB is fixed by the clamp device 40. Furthermore, after the fixed state of the optical fiber FB by the clamp device 40 is released, the constant length of the optical fiber FB is fed in the conveyance direction D1 by the optical fiber feeder 50. Therefore, positioning accuracy and the like at the time of writing a grating G can be improved, and an optical fiber grating having good characteristics can be manufactured as a result thereof.

Furthermore, in the present embodiment, in a case where a load applied to the optical fiber FB is varied by each of the load variable mechanisms 80, 90, a feeding amount of the optical fiber FB in the conveyance direction D1 by the optical fiber feeder 50 is adjusted in accordance with a varied amount of the load. This can compensate for the change in the stretched amount of the optical fiber FB caused by varying the load applied to the optical fiber FB, and an interval between gratings G can be controlled with high accuracy.

While the embodiments of the present invention have been described above, the present invention is not limited to the above-described embodiments, and can be freely modified within the scope of the present invention.

For example, in the above-described embodiments, the example is described in which the irradiation unit 54 is attached to the movable stage 52 of the optical fiber feeder 50. However, the irradiation unit 54 is not necessarily provided at the movable stage 52 of the optical fiber feeder 50, and may be provided separately from the optical fiber feeder 50. In a case where the optical fiber feeder 50 and the irradiation unit 54 are provided separately, the irradiation unit 54 may be attached to, for example, a moving device having positioning accuracy similar to that of the optical fiber feeder 50.

Additionally, in the above-described embodiments, the example is described in which the phase mask M is irradiated with the laser light LB while moving the movable stage 52 in the direction opposite to the conveyance direction D1 of the optical fiber FB. However, the phase mask M may be irradiated with the laser light LB while making the movable stage 52 reciprocate in a longitudinal direction of an optical fiber FB, and also the phase mask M may be irradiated with the laser light LB in a state where the movable stage 52 is stopped.

Furthermore, in the above embodiments, the example is described in which the optical fiber FB is fixed by the clamp device 40 at the position (first position) located more on the upstream side than the mask unit 30 and at the position (second position) located more on the downstream side than the mask unit 30. However, as far as an optical fiber grating having good characteristics can be manufactured, the optical fiber FB can be fixed at only one of the above-described positions.

Additionally, the dancer unit 20 does not necessarily have the structure shown in FIG. 1 (structure including two fixed pulleys 21a, 21b, one movable pulley 22, and a tray 23). Similarly, the dancer unit 60 does not necessarily have the structure shown in FIG. 1 (structure including two fixed pulleys 61a, 61b, one movable pulley 62, and a tray 63). As far as constant tension can be appropriately applied to the optical fiber FB to write a grating G in the core C of the optical fiber FB, any structure can be used.

Furthermore, in the above-described embodiments, described is the manufacturing device and manufacturing method of an optical fiber grating to write a grating G by the phase mask method using the phase mask M. However, the present invention is not limited to the manufacturing device and manufacturing method of an optical fiber grating in which a grating G is written by the phase mask method, and the present invention is applicable to a manufacturing device and a manufacturing method of an optical fiber grating in which a grating G is written by another method (such as two-beam interference method).

DESCRIPTION OF THE REFERENCE SYMBOLS

10: Infeed device
20: Dancer unit
21a, 21b: Fixed pulley
22: Movable pulley
30: Mask unit
40: Clamp device
50: Optical fiber feeder
51: Fixed stage
52: Movable stage
53: Clamper
54: Irradiation unit
60: Dancer unit
61a, 61b: Fixed pulley
62: Movable pulley
70: Winder
80, 90: Load variable mechanism
81, 91: Load measuring mechanism
82, 92: Load applying mechanism
C: Core
D1: Conveyance direction
FB: Optical fiber
G: Grating
M: Phase mask

The invention claimed is:

1. A manufacturing device of an optical fiber grating writing a grating in a core of an optical fiber by irradiating the optical fiber with laser light, the device comprising:
   a fixing device configured to fix the optical fiber to at least one of a first position located more on an upstream side and a second position located more on a downstream side in a conveyance direction of the optical fiber than a laser light irradiating position of the optical fiber in a case of writing the grating;
   a feeder configured to be capable of linearly reciprocating in the conveyance direction and configured to feed a predetermined length of the optical fiber in the conveyance direction in a case where a fixed state of the optical fiber by the fixing device is released, the feeder comprising:
      a fixed portion having a guide extending in the conveyance direction, and
      a movable portion capable of reciprocating along the guide; and
   a holder attached to a position right above the movable portion and configured to hold the optical fiber when the movable portion is moved in the conveyance direction.

2. The manufacturing device of an optical fiber grating according to claim 1, wherein the feeder comprises an irradiator attached to the movable portion and configured to emit laser light.

3. The manufacturing device of an optical fiber grating according to claim 2, wherein
   the movable portion is moved in a direction along a longitudinal direction of the optical fiber in a state where the holder does not hold the optical fiber, and
   the irradiator is configured to emit laser light to a phase mask arranged at the irradiating position.

4. The manufacturing device of an optical fiber grating according to claim 1, further comprising:
   an infeed device configured to feed the optical fiber; and
   a winder configured to wind up the optical fiber in which the grating has been written.

5. The manufacturing device of an optical fiber grating according to claim 1, further comprising:
   a first tension applicator arranged more on an upstream side than the first position and configured to apply tension to be applied to the optical fiber; and
   a second tension applicator arranged more on a downstream side than the second position and configured to apply tension to be applied to the optical fiber.

6. The manufacturing device of an optical fiber grating according to claim 5, wherein each of the first tension applicator and the second tension applicator comprises:
   a pair of fixed pulleys where the optical fiber is passed around in a rotatably supported manner; and
   a movable pulley where the optical fiber is passed halfway around at a lower position between the pair of fixed pulleys.

7. The manufacturing device of an optical fiber grating according to claim 6, wherein each of the first tension applicator and the second tension applicator comprises a load variable mechanism connected to the movable pulley and capable of adjusting a load applied to the optical fiber.

8. The manufacturing device of an optical fiber grating according to claim 7, wherein the load variable mechanism comprises:

a load measuring mechanism configured to measure a load applied to the optical fiber; and a load applying mechanism configured to apply a load to the optical fiber, and the load variable mechanism adjusts a load applied to the optical fiber by controlling the load applying mechanism in accordance with a measurement result of the load measuring mechanism.

9. A manufacturing method of an optical fiber grating, comprising:

fixing an optical fiber to at least one of a first position located more on an upstream side and a second position located more on a downstream side in a conveyance direction of the optical fiber than a laser light irradiating position of the optical fiber in order to write a grating in a core of the optical fiber;

irradiating the irradiating position with the laser light;

releasing a fixed state of the optical fiber at the first position and the second position;

feeding a predetermined length of the optical fiber in the conveyance direction by using a feeder having a structure capable of linearly reciprocating in the conveyance direction and comprising, a fixed portion having a guide extending in the conveyance direction, a movable portion capable of reciprocating along the guide, and a holder attached to a position right above the movable portion and configured to hold the optical fiber when the movable portion is moved in the conveyance direction; and holding the optical fiber when the movable portion is moved in the conveyance direction.

10. The manufacturing method of an optical fiber grating according to claim 9, in which the feeder is provided with an irradiator configured to emit laser light, the method comprising, in the step of irradiating the laser light:

moving the feeder in a direction along a longitudinal direction of the optical fiber, and emitting the laser light from the irradiator to a phase mask arranged at the irradiating position.

11. The manufacturing method of an optical fiber grating according to claim 9, further comprising: feeding an optical fiber having a length corresponding to the predetermined length from an infeed device to the first tension applicator arranged more on an upstream side than the first position and configured to apply tension to the optical fiber before fixing the optical fiber; and also winding up the optical fiber by a winder from the second tension applicator arranged more on a downstream side than the second position and configured to apply tension to the optical fiber.

12. The manufacturing method of an optical fiber grating according to claim 9, further comprising: adjusting a load applied to the optical fiber during a period from when emission of the laser light is terminated until the optical fiber is started to be fixed again.

13. The manufacturing method of an optical fiber grating according to claim 12, further comprising, in the step of adjusting a load:

measuring a load applied to the optical fiber; and controlling a load applied to the optical fiber in accordance with a measurement result of the load.

\* \* \* \* \*